United States Patent
Sol et al.

(10) Patent No.: US 6,559,419 B1
(45) Date of Patent: May 6, 2003

(54) MULTI-ZONE ARRANGEMENT FOR HEATABLE VEHICLE WINDOW

(75) Inventors: Jean-Marc Sol, Thionville (FR); Issam Sabra, Metz (FR); Bernd Feider, Wasserbilig (LU); Charles Courlander, Gonderange (LU)

(73) Assignee: Centre Luxembourgeois de Recherches pour le Verre et la Ceramique S.A. (C.R.V.C.), Grand Duchy (LU)

( * ) Notice: Subject to any disclaimer, the term of this patent is extended or adjusted under 35 U.S.C. 154(b) by 0 days.

(21) Appl. No.: 09/921,301

(22) Filed: Aug. 3, 2001

(51) Int. Cl.[7] .................................................. H05B 3/84
(52) U.S. Cl. ........................ 219/203; 219/541; 52/171.2
(58) Field of Search ................................ 219/203, 522, 219/541; 52/171.2

(56) References Cited

U.S. PATENT DOCUMENTS

| | | |
|---|---|---|
| 3,790,745 A | 2/1974 | Levin |
| 3,792,232 A | 2/1974 | Zarenko |
| 3,794,809 A | 2/1974 | Beck et al. |
| 3,893,234 A | 7/1975 | Levin |
| 4,543,466 A | 9/1985 | Ramus |
| 4,782,216 A | 11/1988 | Woodard |
| 4,820,902 A | 4/1989 | Gillery |
| 4,894,513 A | 1/1990 | Koontz |
| 4,902,875 A | 2/1990 | Koontz |
| 4,940,884 A | 7/1990 | Gillery |
| 5,182,431 A | 1/1993 | Koontz et al. |
| 5,229,205 A | 7/1993 | Nietering |
| 5,414,240 A | 5/1995 | Carter et al. |
| 5,434,384 A | 7/1995 | Koontz |
| 5,653,903 A | 8/1997 | Pinchok, Jr. et al. |
| 5,824,994 A | 10/1998 | Noda et al. |
| 5,877,473 A | 3/1999 | Koontz |
| 2002/0015824 A1 | 2/2002 | Kawamoto et al. |

*Primary Examiner*—Joseph Pelham
(74) *Attorney, Agent, or Firm*—Nixon & Vanderhye P.C.

(57) ABSTRACT

A heatable vehicle window including at least three different heating zones. A conductive coating is divided into at least three different heatable coating portions which are spaced apart from one another. A top bus bar includes a step or protruding portion which extends toward the bottom bus bar at an area of an intermediate one of the heatable coating portions. This protruding portion enables, for example and without limitation, a rain sensor or toll device to efficiently transmit and/or receive signals (e.g. IR signals, RF signals, or the like) through the window at an area behind the protrusion where the coating has been deleted. Because of the division of the coating into at least three different heatable coating portions, approximately uniform current distribution is enabled along the top bus bar (even at the protruding portion thereof) so as to reduce the likelihood of overheating.

19 Claims, 7 Drawing Sheets

MULTI-ZONE ARRANGEMENT FOR HEATABLE VEHICLE WINDOW

RELATED APPLICATION

This application relates to U.S. patent application Ser. No. 09/832,335, now U.S. Pat. No. 6,492,619, filed Apr. 11, 2001, the entire disclosure of which is hereby incorporated herein by reference.

BACKGROUND OF THE INVENTION

This invention relates to a heatable vehicle window (e.g., vehicle windshield) including at least first, second and third heating zones.

Heatable windows are known in the art. For example, see U.S. Pat. Nos. 3,893,234 and 5,229,205, the disclosures of which are hereby incorporated herein by reference. Conventional heatable windows for vehicles typically include first and second conductive bus bars in electrical contact with a conductive coating including an electroconductive layer. The first bus bar is usually provided at a top portion of the window, and the second bus bar at a bottom portion of the window. The electroconductive layer, at a location between the bus bars, generates heat when electric current is passed therethrough via the bus bars. In such a manner, snow and ice may be melted from vehicle windows such as windshields, backlites, sidelites, and/or the like. Windows may also be defogged in such a manner.

In recent years, devices such as rain sensors and/or toll devices have become desirable in vehicles such as cars, trucks, sport utility vehicles (SUVs), and the like. Rain sensors and/or toll devices are often mounted within the vehicle proximate a top portion of the windshield (e.g., near where rearview mirrors are sometimes located). Rain sensors and/or toll devices typically transmit and/or receive signals (e.g., infrared signals (e.g., 880 nm), RF signals, electromagnetic signals, etc.) through the windshield. Accordingly, it is undesirable to position signal inhibiting structures such as metal bus bars and/or conductive coatings in areas of a windshield through which such signals must be transmitted/received by rain sensors and/or toll devices. Unfortunately, if one were to simply modify the shape of the upper bus bar in a conventional heatable windshield to loop around the rain sensor and/or toll device area (e.g., see FIG. 4), then hot spots would tend to develop at corners/curved areas of the upper bus bar as the windshield is heated (i.e., the current flow is not approximately uniformly distributed).

In view of the above, it will become apparent to those skilled in the art that there exists a need in the art for a heatable window design which enables current flow to be approximately uniformly distributed, so as to reduce the likelihood of overheating and enable efficient heating of the window.

SUMMARY OF THE INVENTION

An object of this invention is to provide an efficient bus bar arrangement for a heatable vehicle window (e.g., windshield).

Another object of this invention is to provide a heatable vehicle window including at least first, second, and third heating zones. In certain embodiments, each zone includes its own heatable coating portion which does not extend into any of the other heating zones.

Another object of this invention is to provide a heatable window design which is capable of accommodating a rain sensor and/or toll device coating deletion area, without being susceptible to a high likelihood of overheating.

Another object of this invention is to fulfill one or more of the above-listed objects.

This invention will now be described with respect to certain example embodiments thereof as illustrated in the following drawings, wherein:

IN THE DRAWINGS

DETAILED DESCRIPTION OF CERTAIN EXEMPLARY EMBODIMENTS OF THE INVENTION

Figure 1:
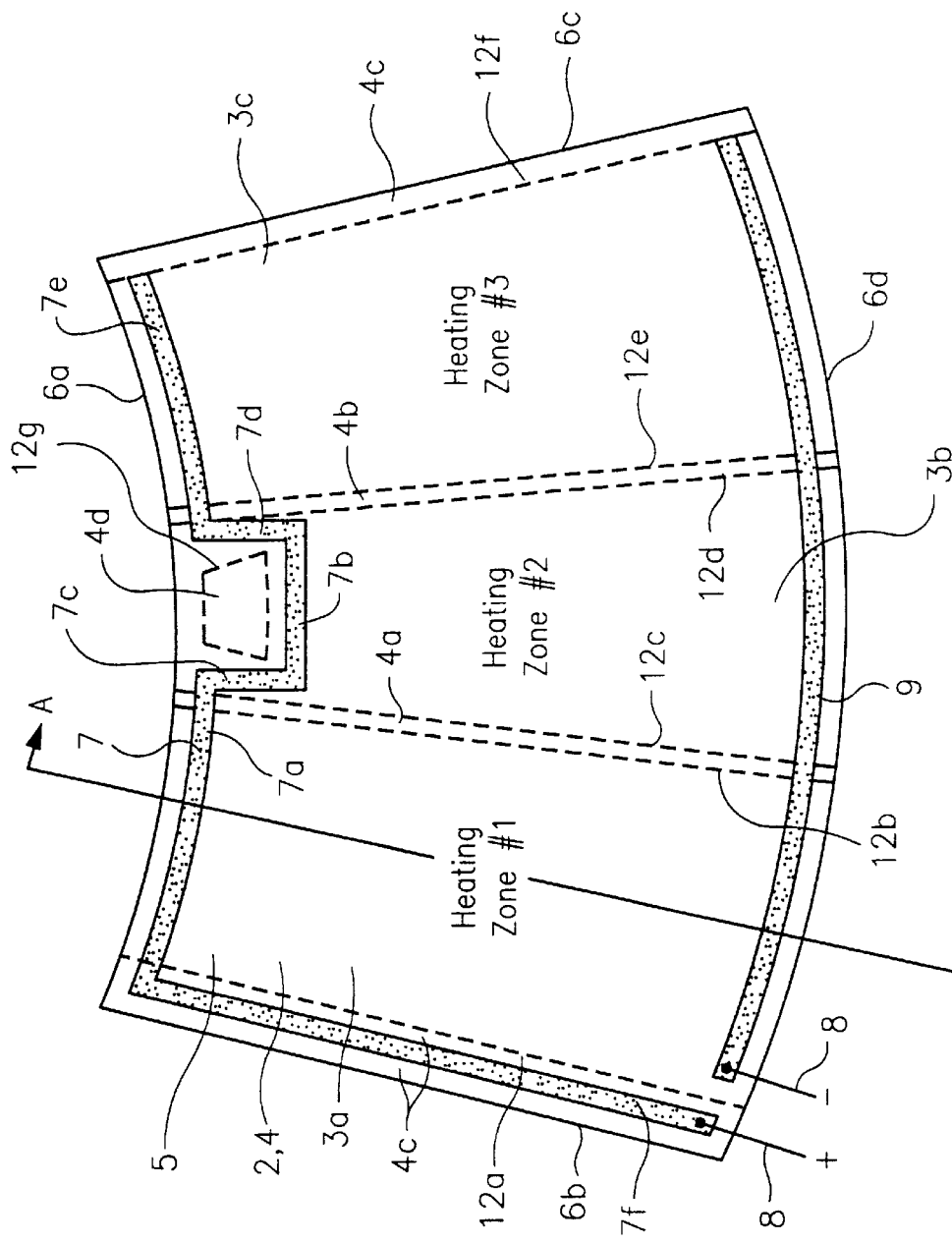
FIG. 1 is a top plan view of a heatable vehicle windshield according to an exemplary embodiment of this invention (absent opaque shielding layers for purposes of illustration simplicity).

Referring now more particularly to the accompanying drawings in which like reference numerals indicate like parts or layers throughout the several views.

Certain embodiments of this invention relate to a heatable vehicle window (e.g., windshield, backlite, etc.) including multiple heating zones. A heatable coating (including one or more layers, at least one of which is conductive and heatable) is originally provided on a substrate of the window. The original coating is partially deleted so as to divide the original coating into at least three different spaced apart heatable coating portions and heating zones. First and second spaced apart conductive bus bars are provided over the heatable coating portions, with both bus bars being in electrical communication with each of the at least three different heatable coating portions. Using the two bus bars, current is caused to run through the at least three different spaced apart heatable coating portions in order to heat the same, thereby enabling the window to be heated.

In certain embodiments, at least the top bus bar includes a step or protruding portion which protrudes or extends toward the bottom bus bar at an area of an intermediate one of the heatable coating portions. This protruding portion enables, for example and without limitation, a rain sensor or toll device to efficiently transmit and/or receive signals (e.g. IR signals, RF signals, or the like) through the window at an area behind the protrusion where the coating has been deleted. Because of the division of the coating into at least three different heatable coating portions, approximately uniform current distribution is enabled along the top bus bar (even at the protruding portion thereof) so as to reduce the likelihood of overheating when the window is being heated. In alternative embodiments of this invention, the toll device and/or rain sensor may be located at another location (e.g., at a bottom portion or side portion of the window, or at a non-central top portion of the window), in which case the protruding portion of the bus bar (e.g., top bus bar) would be similarly located at a location corresponding to that of the toll device and/or rain sensor.

Figure 8:
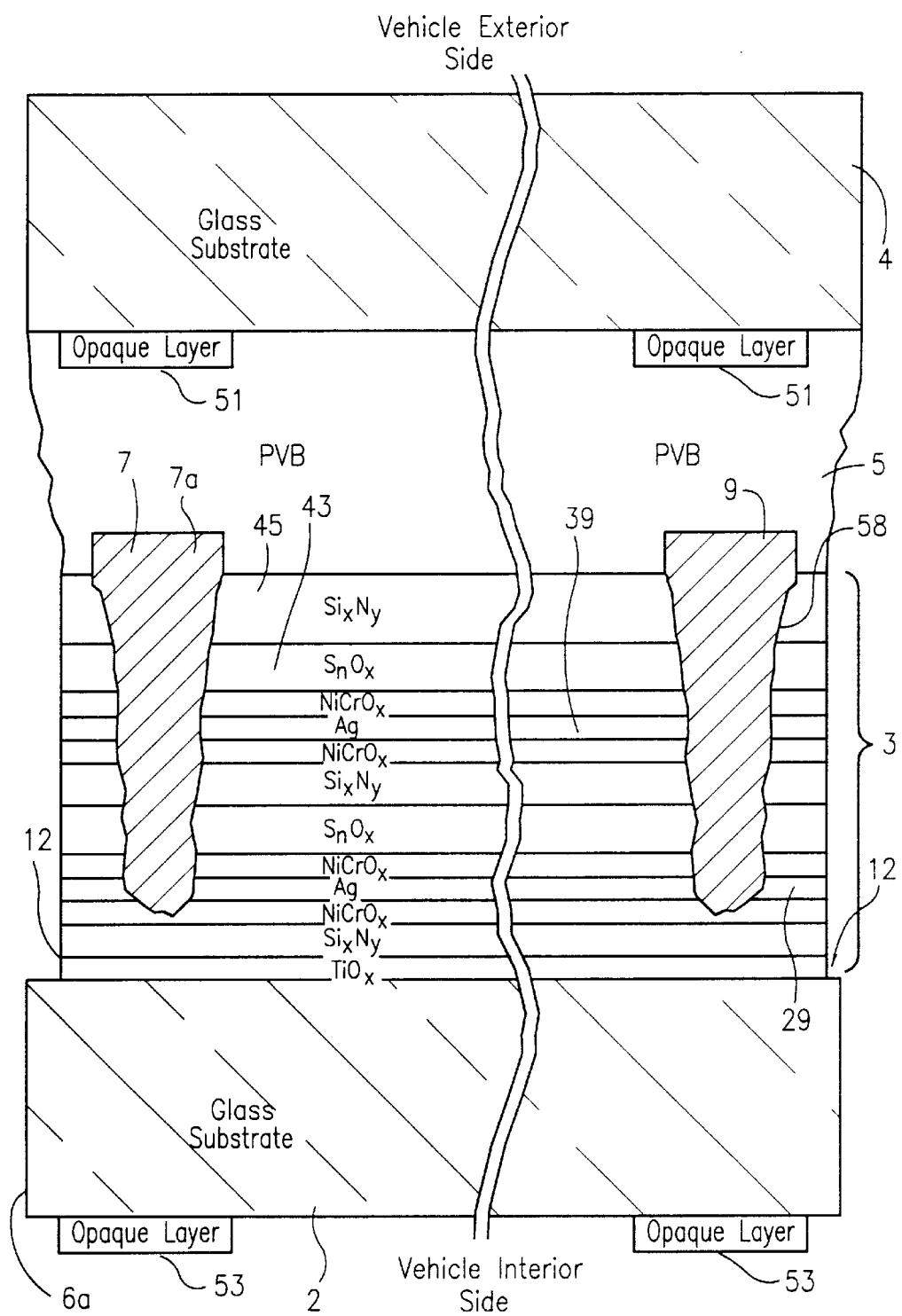
FIG. 8 is a side cross sectional view of the vehicle window of FIG. 1 (taken along Section Line A—A in FIG. 1), after the FIG. 7 structure has been laminated to another glass or plastic substrate with a polymer (e.g., PVB) inclusive interlayer provided therebetween to complete a vehicle windshield or other vehicle window.

FIG. 1 illustrates an example embodiment of this invention (opaque shielding layers are omitted from FIG. 1 for purposes of illustration simplicity). Referring to FIGS. 1 and 8, the vehicle windshield includes coating 3 sandwiched between first and second glass substrates 2 and 4, respectively. Coating 3 may be a single layer coating (e.g., of conductive Ag or ITO) in certain embodiments of this invention, or alternatively may be a multi-layer low-E coating in other embodiments of this invention such as that shown in FIG. 8. Coating 3 is at least partially deleted via deletion lines 12a, 12b, 12c, 12d, 12e and 12f in order to divide the coating 3 into at least three different spaced apart heatable coating portions, i.e., first heatable coating portion 3a, second or intermediate heatable coating portion 3b, and third heatable coating portion 3c. Such deletion of the original coating 3 may be done via laser deletion, sandblasting deletion, a deleting abrasive wheel or disc, or any other suitable coating deletion technique/device.

Heatable coating portions 3a, 3b and 3c are spaced apart from one another by insulating areas 4a, 4b formed by the coating deletion (i.e., see deletion/insulating area 4a between heatable coating portions 3a and 3b, and deletion/insulating area 4b between heatable coating portions 3b and 3c). Generally, coating deletions are illustrated by broken lines 12 in FIGS. 1–3. Because the coating 3 is deleted at 4a (via deletion lines 12b and 12c) and 4b (via deletion lines 12d and 12e), the different spaced apart heatable coating portions 3a, 3b and 3c can be electrically insulated from one another to at least some extent (completely or at least partially). For purposes of example only, insulating/deletion areas 4a and 4b can be formed in the shape of a fine line (e.g., providing a gap of about 0.5 mm or less). Optionally, in certain embodiments, the coating 3 may also deleted along at least one edge of the window (e.g., see coating deletion area 4c along edge(s) of the window) so as to accommodate a bus bar lead, extension(s), or the like. Optionally, coating 3 may also be deleted at area 4d (i.e., rain sensor or toll device window) via deletion line 12g so as to allow a rain sensor, toll device, or the like to more easily transmit and/or receive signals through that portion of the window. As shown, the toll device and/or rain sensor coating deletion area 4d is preferably enclosed by deletion line 12g and thus by coating 3 of the intermediate coating portion 3b.

Still referring to FIGS. 1 and 8, polyvinyl butyral (PVB) inclusive interlayer 5 is provided between the substrates 2, 4, for conventional lamination purposes. According to certain embodiments of this invention, coating 3 is provided on the interior surface of one of substrates 2, 4, so that the coating is provided on what is known conventionally as the windshield's second or third surface. The window or windshield shown in FIG. 1 includes top side/edge 6a, side edges 6b and 6c, and bottom side/edge 6d.

Top and bottom electroconductive elongated bus bars 7 and 9, respectively, are provided between the substrates 2, 4. Top bus bar 7 and bottom bus bar 9 are each in electrical communication (directly or indirectly) with each of the at least three heatable coating portions 3a, 3b and 3c. Heating zone #s 1–3 are defined by the heatable coating portions 3a–3c, respectively, at the areas thereof between the opposing bus bars 7 and 9. While three different heatable coating portions 3a–3c are shown in FIG. 1 (and thus three different heating zones), it will be understood by those skilled in the art that additional separate and distinct heatable coating portions may be provided by additional deletion lines 4 (in which case, each of the bus bars 7 and 9 may be in electrical contact with the additional heatable coating portions).

Conductive top bus bar 7 includes: (a) first bus bar portion 7a for heating zone #1, this heating zone #1 defined by the area of coating portion 3a between bus bars 7 and 9, (b) a bus bar protruding portion including at least protrusion base 7b and opposing approximately parallel protruding legs 7c, 7d for heating zone #2, this heating zone #2 defined by the area of intermediate heatable coating portion 3b between bus bars 7 and 9, (c) bus bar portion 7e for heating zone #3, zone #3 being defined by the area of coating portion 3c between bus bars 7 and 9, and (d) elongated extension portion 7f provided along or adjacent window edge 6b in insulating deletion area 4c so that a connector 8 for the top bus bar may be connected at the bottom of the window proximate another connector 8 for the bottom bus bar. Extension portion 7f is spaced from and not in electrical contact with the adjacent edge of heatable coating portion 3a. Top bus bar portion 7a is in electrical contact/communication with first coating portion 3a, while top bus bar portions 7b, 7c, and 7d are in electrical contact/communication with second or intermediate coating portion 3b, and top bus bar portion 7e is in electrical contact/communication with third coating portion 3c. Bottom bus bar 9 extends across and is in electrical contact/communication with all three coating portions 3a–3c. Bus bars 7 and 9 are spaced apart from one another. Thus, applying voltage across bus bars 7 and 9 causes current to run through all three coating portions 3a–3c thereby causing heating zone #1, heating zone #2 and heating zone #3 to heat up thereby heating the window in order to defog, defrost, and/or melt ice/snow from the same.

Electrical connections/connectors 8 supply power to the coating 3 via bus bars 7, 9 from an external power source. An exemplary external power source may be a DC battery of the vehicle, and is represented by "+" and "−" in FIG. 1. Connectors 8 are shown in FIG. 1 as being located at or along a bottom edge of the window for both the top and bottom bus bars. However, it will be recognized that in alternative embodiments of this invention, a connector 8 for the top bus bar 7 may be located along the top of the window (or at a side), while the connector 8 for the bottom bus bar 9 may be located along the bottom of the window (or along a side).

Still referring to FIG. 1, bus bar portions 7a, 7b, and 7e are approximately parallel (i.e., parallel plus/minus about 20 degrees) to one another, and each is also approximately parallel to at least a portion of bottom bus bar 9. Also, bus bar portions 7a, 7b and 7e are approximately parallel to the top edge 6a of the window, while at least part of bottom bus bar 9 is approximately parallel to the bottom edge 6d of the window. Extension 7f is approximately parallel to the side edge 6b of the window, and to the adjacent edge of coating portion 3a. In certain embodiments, extension 7f is approximately perpendicular (i.e., perpendicular plus/minus about 20 degrees) to bus bar portion 7a. Likewise, top bus bar portions 7c and 7d are approximately perpendicular to adjacent parts of top bus bar portions 7a, 7b and 7e.

Deletion areas 4a and 4b are formed very close to and approximately parallel to bus bar portions 7c and 7d in certain embodiments of this invention, with leg portions 7c and 7d remaining over coating portion 3b. This enables, for example, heating zone #s 1–3 to achieve a more rectangular-like shape as shown in the drawings, which can result in more uniform current/heat distribution. Each coating portion 3a–3c, in certain example embodiments, is four-sided, with each side having an opposing side which is approximately (i.e., within about 10 degrees) parallel thereto.

It is noted that conductive bus bar portions 7a, 7e, 7f, and 9 are said to be located "adjacent" or "along" an edge(s) of the window, even though they may (and are preferably) spaced inwardly from the relevant edge(s) of the window to some small extent (e.g., 0.5 to 30 cm). Thus, when used relative to an edge of the window or windshield, the words "adjacent" and "along" as used herein mean that at least a portion of the conductive bus bar portion or bus bar is/are within about 30 cm of the mentioned edge of the windshield or window.

Figure 4:
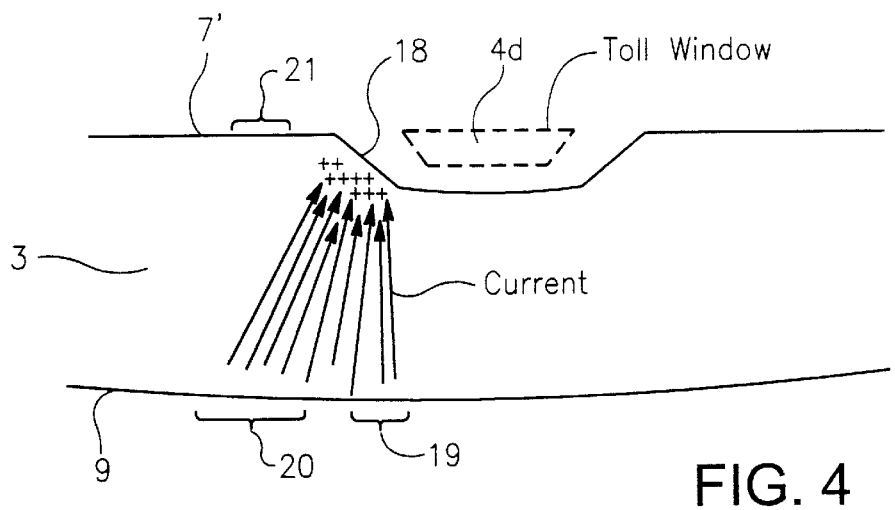
FIG. 4 is a schematic illustration of a heatable vehicle windshield where the top bus bar of a conventional windshield is simply wound around a rain sensor and/or toll device area (this drawing is provided for comparative purposes).
Figure 5:
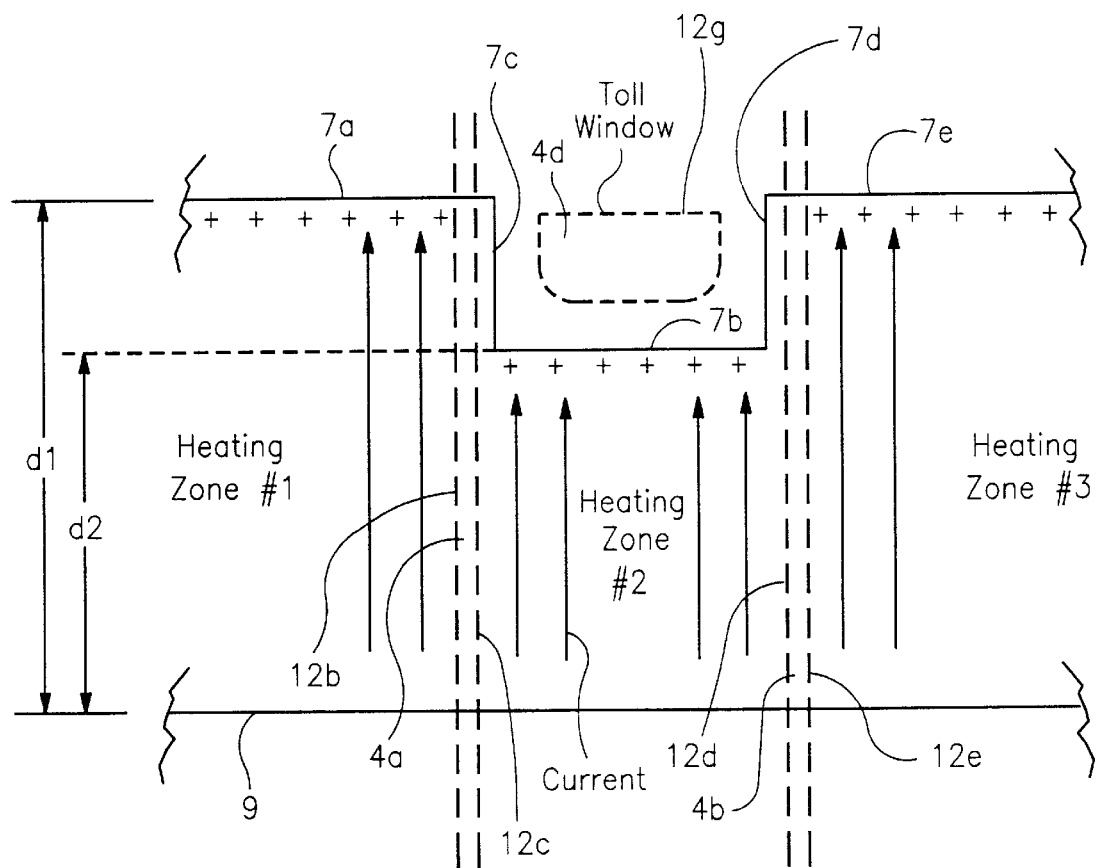
FIG. 5 is a schematic illustration of approximately uniform current distribution resulting from the design of FIG. 1 (compare to FIG. 4).

Referring to FIGS. 1 and 4–5, it will be explained how the presence in FIGS. 1 and 5 of the top bus bar protruding portion (i.e., bus bar portions 7b, 7c and 7d) combined with the division of coating 3 into at least three separate heatable coating portions 3a, 3b and 3c is advantageous relative to the FIG. 4 design where the coating 3 is not divided (i.e., it is continuous across the window) and the top bus bar 7' is simply looped around the toll window coating deletion area 4d. In FIG. 4, hot spots (i.e., overheating) are formed at the angled portion 18 of the top bus bar 7' because current flows thereto not only from the portion 19 of the bottom bus bar directly across from the same, but also from laterally spaced area 20 of the bottom bus bar 9. In FIG. 4, current flows to angled portion 18 of the top bus bar 7' from area 20 of the bottom bus bar 9, because (i) there is an electrically conductive path between the two via continuous coating 3, and (ii) this path is shorter than a path from area 20 directly across the coating 3 to area 21.

However, in the design of FIGS. 1 and 5, the deletion 4a of coating 3 creates an insulating area between coating portions 3a and 3b thereby preventing a significant amount of current from traveling in the undesirable manner of FIG. 4. Instead, in the design of FIGS. 1 and 5 much of the current flows from one bus bar 9 to the other 7 directly across the coating portions (i.e., not at a significant angle as in FIG. 4). This enables currently distribution to be more uniform, and the likelihood of overheating to be reduced relative to the FIG. 4 design. In other words, approximately uniform current distribution is achieved in FIGS. 1 and 5, while at the same time room is made behind bus bar 7 for toll device or rain sensor deletion area 4d.

Specific Power (P) is defined by: $P=V^2/R_s d^2$, where V is voltage, $R_s$ is the sheet resistance of the heatable coating, and d is the distance between bus bars (e.g., see distances d1 and d2 in FIG. 5). The design of FIGS. 1 and 5 provides two different specific powers, a first specific power for heating zone #s 1 and 3, and another for intermediate heating zone #2 (because heating zone #2 has a smaller "d" than zone #s 1 and 3). Assuming V=42 volts, R=3 ohms, d1=90 cm (heating zone #s 1 and 3), and d2=70 cm (heating zone #2), then the specific power P in zone #s 1 and 3 is 7.2 W/dm², while in heating zone #2 P is 12 W/dm². This means that zone #2 will heat up quicker than zone #s 1 and 3. However, the maximum difference in voltage (ΔV) between zone #s 1 and 2 (or zone #s 2 and 3), is (d2-d1)/d2×42V. Thus, assuming d1=90 cm and d2=70 cm, then ΔV=9V which is relatively small. Because ΔV is relatively small (e.g., less than 20V, more preferably less than 15V, and most preferably less than 10V), then deletion area 4a (and 4b) between heatable coating portions 3a and 3b can be very thin as discussed above, thereby enabling most of the viewing area of the window to be heated when desired (i.e., the low value of ΔV means that not much current will jump from one heating zone to an adjacent zone during heating).

In certain preferred embodiments, distance d1 between the bus bars 7 and 9 across a portion of coating portion 3a (or 3c) is at least 7 cm (more preferably at least 10 cm) greater than a distance d2 between the bus bars 7 and 9 across a portion of coating portion 3b. This enables the design to provide room for the toll device or rain sensor coating 3 deletion area above the top bus bar.

Figure 2:
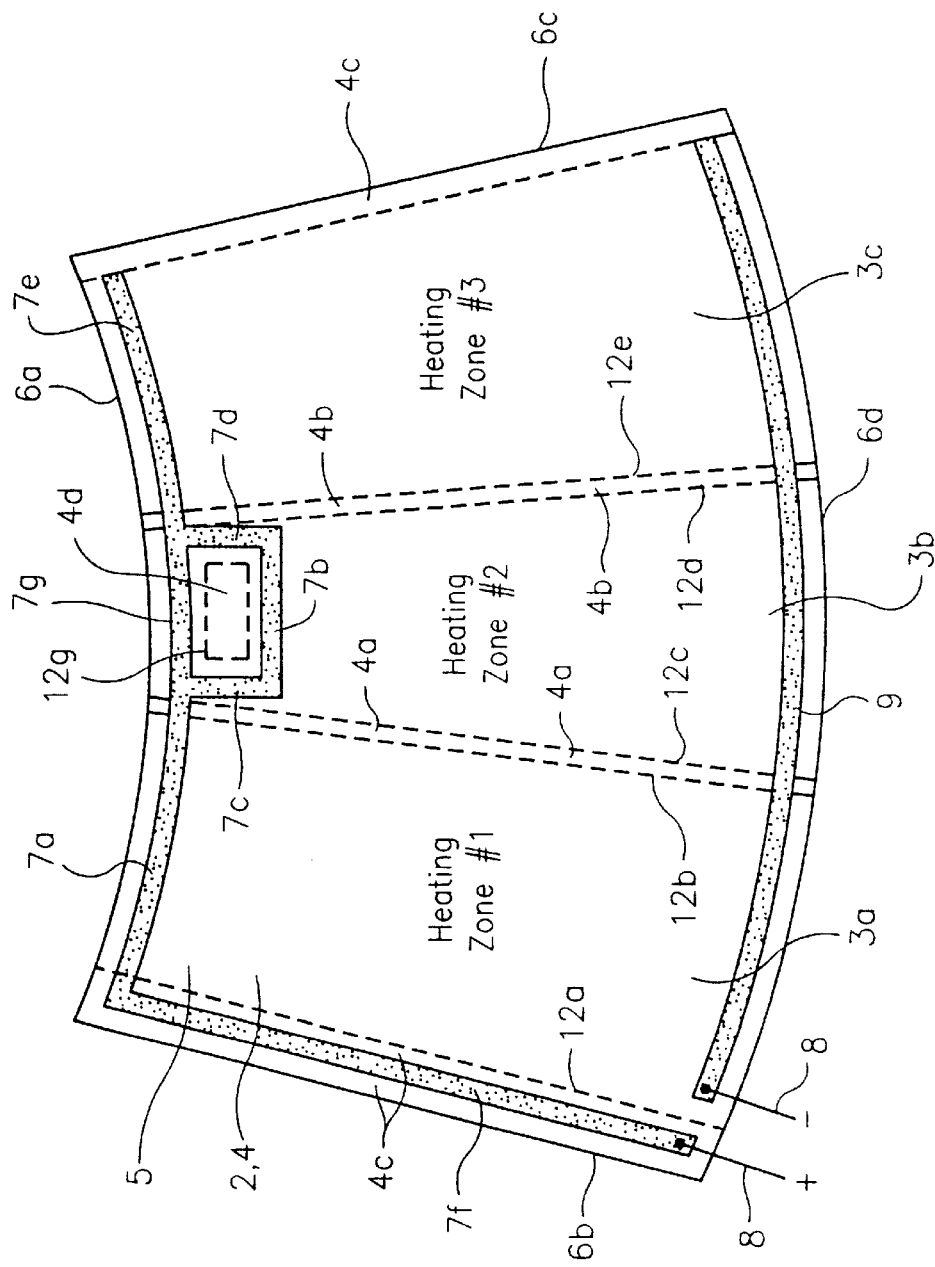
FIG. 2 is a top plan view of a heatable vehicle windshield according to another exemplary embodiment of this invention (absent opaque shielding layers for purposes of illustration simplicity).

FIG. 2 illustrates another embodiment of this invention. The FIG. 2 embodiment is the same as in FIG. 1, except that an additional top bus bar connecting portion 7g is provided so as to connect legs 7c and 7d and enclose toll device or rain sensor coating deletion area 4d via the top bus bar.

Figure 3:
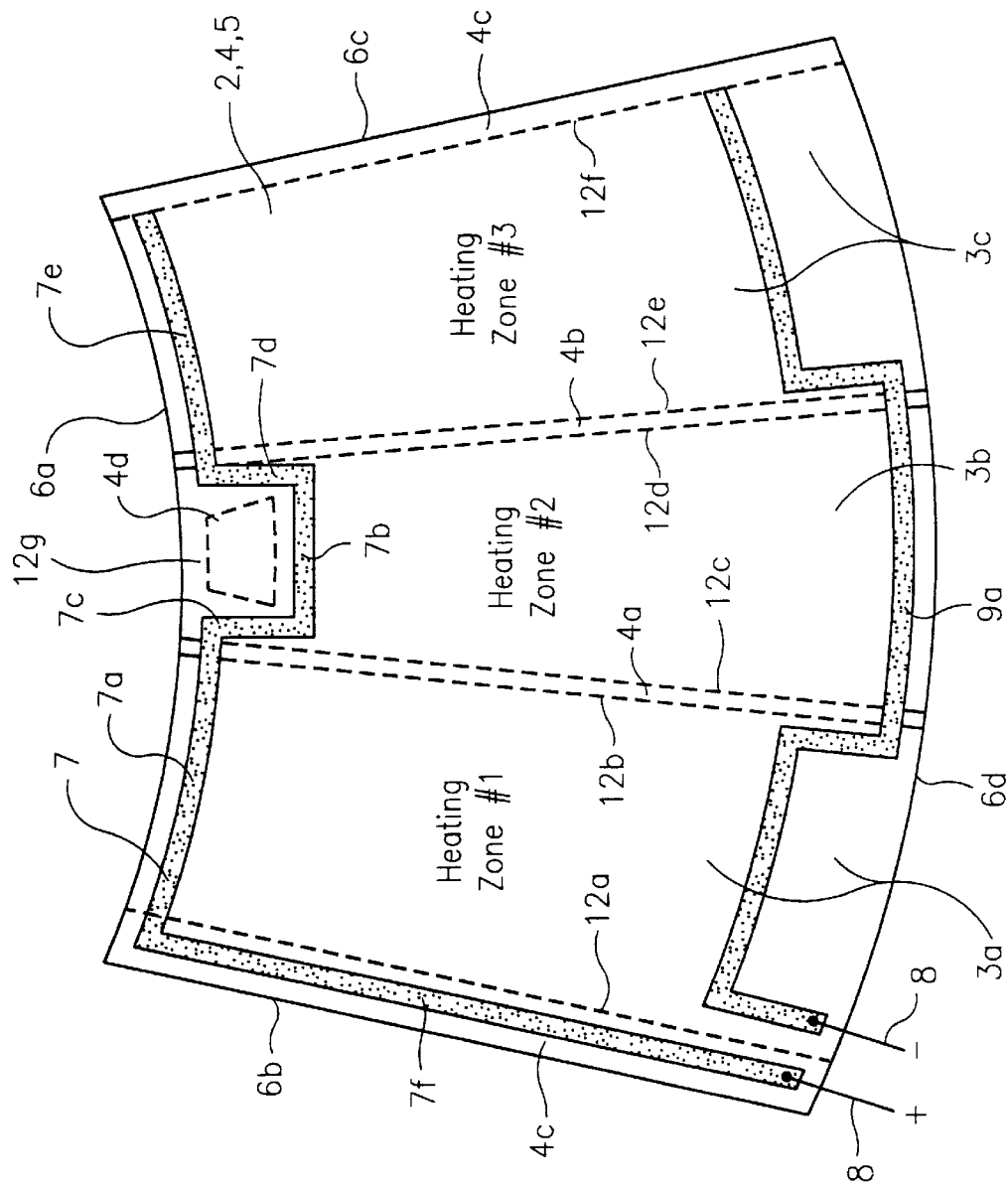
FIG. 3 is a top plan view of a heatable vehicle windshield according to yet another exemplary embodiment of this invention (absent opaque shielding layers for purposes of illustration simplicity).

FIG. 3 illustrates another embodiment of this invention. The FIG. 3 embodiment is the same as in FIG. 1, except that bottom bus bar 9 includes a protruding portion 9a which extends or protrudes from the rest of the bottom bus bar in a direction away from the top bus bar 7. An example advantage of this design is that d1 and d2 will be approximately equal (or closer than in the FIG. 1, 5 design). Accordingly, the specific power P of zone #1 can be made closer to that of zone #2 (likewise with zone #s 2 and 3).

Figure 6:
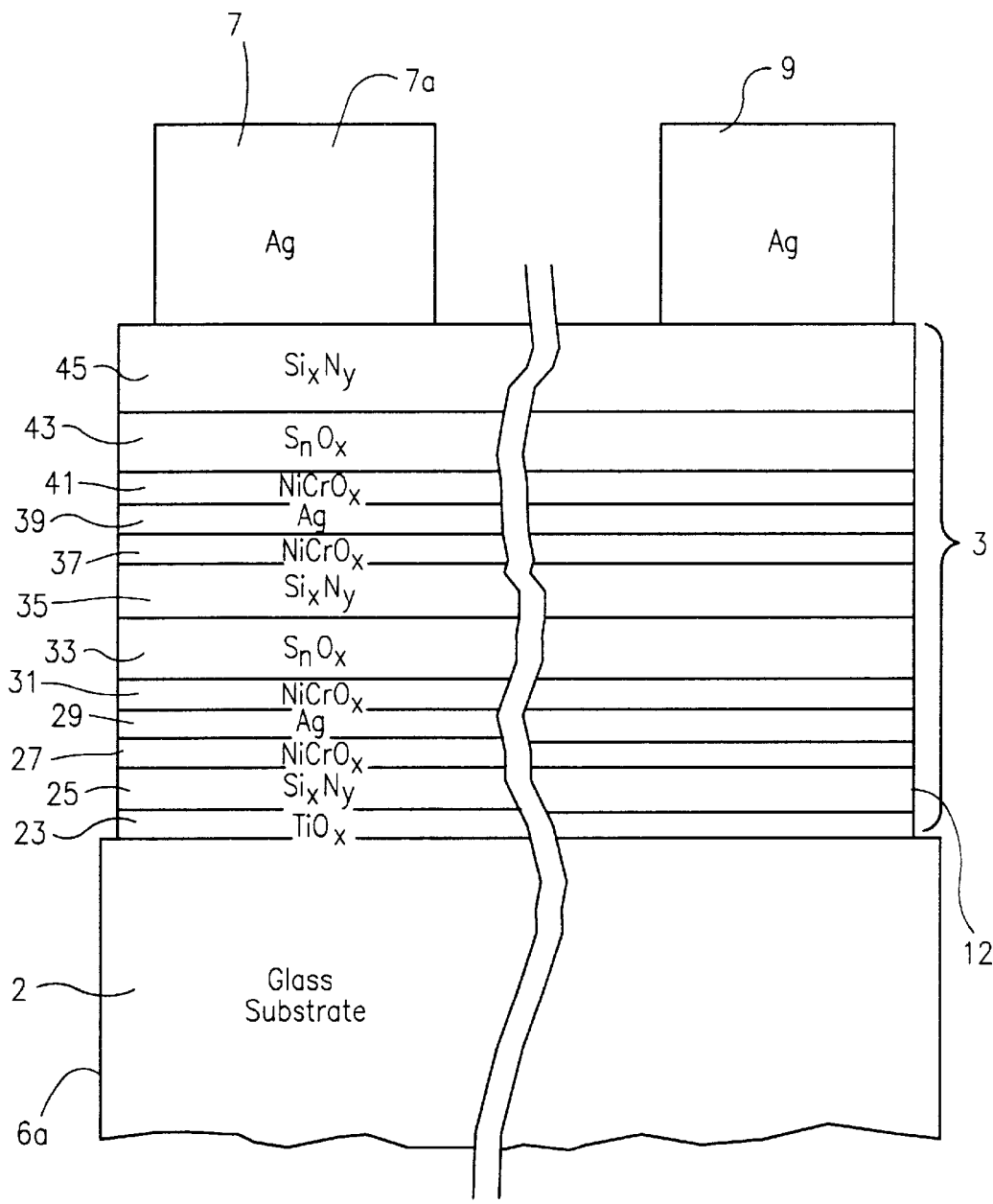
FIG. 6 is a side cross sectional view of a multi-layer coating provided on one of the substrates of the vehicle windshield of FIG. 1, with a pair of silver (Ag) frit inclusive bus bars deposited on the substrate over the coating, during the process of manufacturing the windshield of FIG. 1 (at section line A—A shown in FIG. 1).
Figure 7:
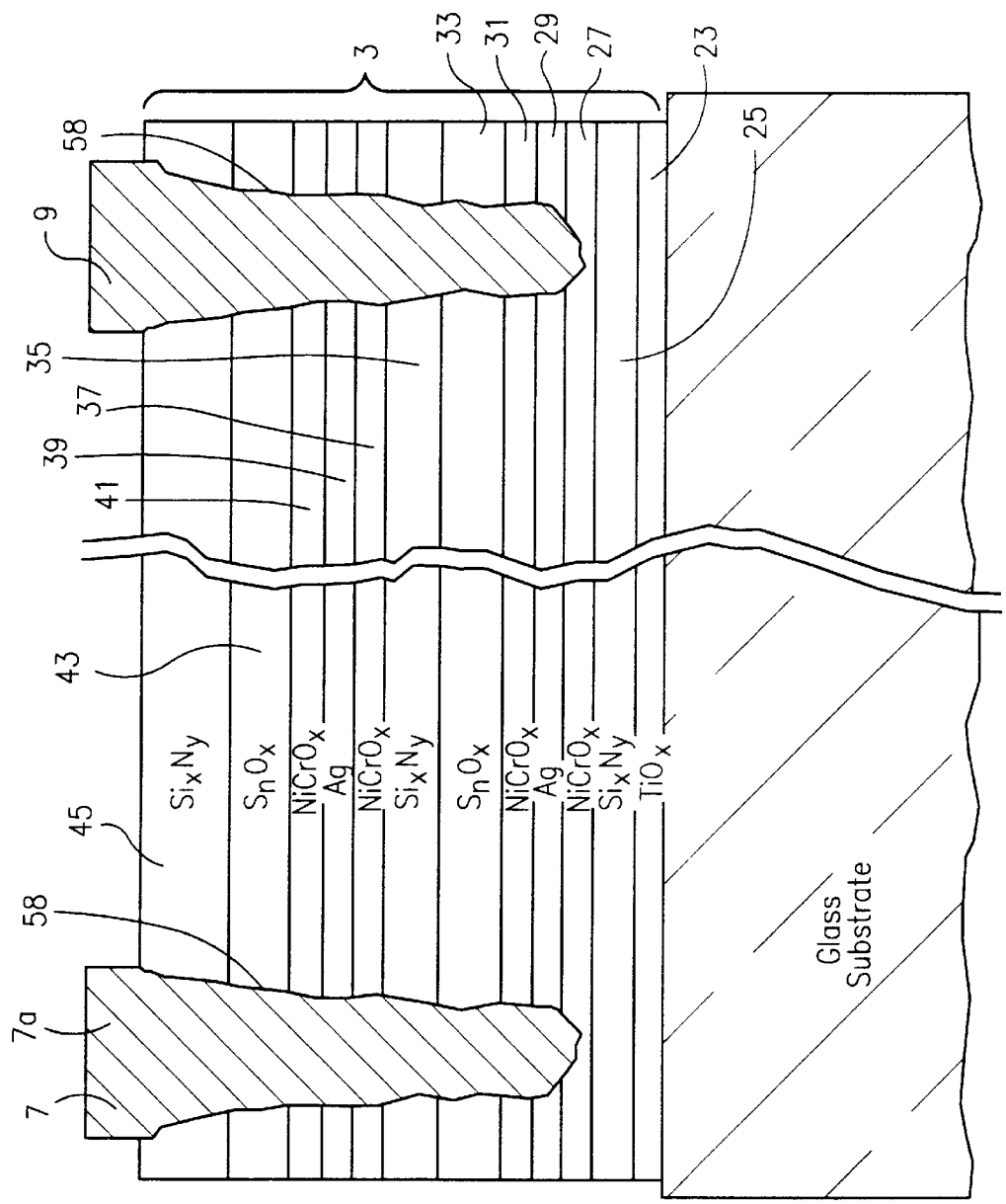
FIG. 7 is a side cross sectional view of the bus bars and coating of FIG. 6, after and/or during heating which causes at least a portion of the bus bars to bleed through at least one dielectric layer of the coating and come into contact with at least one of the electroconductive silver (Ag) layers of the coating thereby establishing an electrical connection with the same.

Referring to FIGS. 6–8, an exemplary method of making the heatable windshield(s) of FIG. 1 will now be described. The materials illustrated for the various layers in FIGS. 6–8 are for purposes of example only. Initially, float glass (e.g., soda-lime-silica glass) substrate 2 is provided. Substrate 2 is from about 1.0 to 10.0 mm thick, more preferably from about 1.6 mm to 4 mm thick. Low-E coating 3 is deposited on substrate 2 (a single layer Ag or ITO coating may be provided in alternative embodiments). Multi-layer coating 3 includes first dielectric anti-reflection layer 23, second dielectric haze-reducing layer 25, first lower contact layer 27 (which contacts layer 29), first electroconductive metallic infrared (IR) reflecting layer 29, first upper contact layer 31 (which contacts layer 29), third dielectric layer 33 (which may be deposited in one or multiple steps in different embodiments of this invention), fourth dielectric layer 35, second lower contact layer 37 (which contacts layer 39), second electroconductive metallic IR reflecting layer 39, second upper contact layer 41 (which contacts layer 39), fifth dielectric layer 43, and finally sixth protective dielectric layer 45. The "contact" layers each contact at least one IR reflecting layer. The aforesaid layers 23–45 make up heat treatable low-E (i.e., low emissivity) coating 3 which is provided on substrate 2. Conductive layer(s) 29 and/or 39 function to heat the window when current passes therethrough.

In certain embodiments of this invention, first dielectric layer 23 may be of or include titanium dioxide ($TiO_x$ where x is from 1.7 to 2.3, most preferably 2.0), silicon nitride ($Si_xN_y$ where x/y may be about 0.75 (i.e., $Si_3N_4$), or alternatively x/y may be from about 0.76 to 1.5 in Si-rich embodiments), silicon dioxide ($SiO_x$ where x is from 1.7 to 2.3, most preferably about 2.0), niobium oxide (e.g., $Nb_2O_5$), SiZrN, tin oxide, zinc oxide, silicon oxynitride, or any other suitable dielectric material. First dielectric layer 23 functions as an antireflection layer in certain embodiments of this invention.

Second dielectric layer 25 may function to reduce haze in certain embodiments of this invention, and is preferably of or includes silicon nitride (e.g., $Si_3N_4$, or alternatively silicon-rich silicon nitride $Si_xN_y$ where x/y is from 0.76 to 1.5, more preferably from 0.85 to 1.2). When sputtering silicon nitride layer(s) herein, a Si target may be used, or alternatively a target including Si admixed with up to 3–20% by weight aluminum and/or stainless steel (e.g. SS#316) may be used, with about this amount of aluminum and/or steel then appearing in the layer(s) so formed. Other materials may also be used for haze reducing layer 25, including but not limited to SiZrN.

While $Si_3N_4$ may be used for layer 25 (and/or layer 35) in certain embodiments, it has been found that a silicon rich type of silicon nitride as layer 25 is better at reducing haze and/or improving mechanical durability in certain embodiments of this invention. Absent this layer 25 (and/or 35), haze tends to be at least 0.45; whereas with this layer(s) it is reduced to no greater than 0.4 as discussed herein. In Si-rich silicon nitride embodiments, layer 25 (and/or layer 35) is of or includes $Si_xN_y$ where x/y is from 0.76 to 1.5, more preferably from about 0.85 to 1.2. $Si_3N_4$ has an index of refraction "n" of about 2.04, and an extinction coefficient "k" of about 0. Si-rich silicon nitride according to certain embodiments of this invention may have an index of refraction of at least about 2.05, more preferably of at least about 2.07, and may be 2.08 (at 550 and/or 632 nm) in exemplary embodiments. Also, Si-rich silicon nitride according to certain embodiments of this invention may have an extinction coefficient "k" of at least about 0.001, and more preferably of at least about 0.003. In a first monolithic example after HT of a Si-rich nitride layer 5 (and/or 15), "n" was 2.099 and "k" was 0.0034; while in a second monolithic example after HT "n" was 2.168 and "k" was 0.014. Si-rich silicon nitride, in addition to being better at reducing haze than $Si_3N_4$, has also been found to adhere better to the titanium oxide of layer 23 in example embodiments. Surprisingly, it has also been found that Si-rich silicon nitride under the $NiCrO_x$ and Ag layers provides a lower sheet resistance ($R_s$).

Electroconductive (or simply conductive) infrared (IR) reflecting layers 29 and 39 are preferably metallic and conductive, and may be made of or include silver (Ag), gold, or any other suitable IR reflecting material. However, metallic Ag is the material of choice for the IR reflecting layers 29 and 39 in certain example embodiments of this invention. These IR reflecting layers help enable coating 3 to have low-E characteristics, as well as heatability.

Contact layers 27, 31, 37, and 41 are of or include nickel (Ni) oxide, or a nickel alloy oxide such as nickel chrome oxide ($NiCrO_x$), in preferred embodiments of this invention. $NiCrO_x$ layers 27, 31, 37, and/or 41 may be fully oxidized in certain embodiments of this invention (i.e., fully stochiometric), or may be at least about 75% oxidized in other embodiments of this invention. While $NiCrO_x$ is a preferred material for layers 27, 31, 37 and/or 41, those skilled in the art will recognize that other materials may instead be used (e.g., oxides of Ni, oxides of Ni alloys, oxides of Cr, oxides of Cr alloys, $NiCrO_xN_y$, or any other suitable material) for one or more of these layers. It is noted that contact layers 27, 31, 37 and/or 41 may or may not be continuous in different embodiments of this invention.

When layers 27, 31, 37 and/or 41 comprise $NiCrO_x$ in certain embodiments, the Ni and Cr may be provided in different amounts, such as in the form of nichrome by weight about 80–90% Ni and 10–20% Cr. An exemplary sputtering target for depositing these layers includes not only SS-316 which consists essentially of 10% Ni and 90% other ingredients, mainly Fe and Cr, but Haynes 214 alloy as well, which by weight consists essentially of (as a nominal composition) the following materials which may also show up in these layers:

| Element | Weight % |
|---------|----------|
| Ni | 75.45 |
| Fe | 4.00 |
| Cr | 16.00 |
| C | .04 |
| Al | 4.50 |
| Y | .01 |

One or more of contact layers 27, 31, 37, and/or 41 (e.g., of or including $NiCrO_x$) is/are preferably oxidation graded in certain embodiments of this invention so that the degree of oxidation in the layer(s) changes throughout the thickness of the layer(s). For example, one or more of contact layers (27, 31, 37 and/or 41) may be graded so as to be less oxidized at the contact interface with the immediately adjacent IR reflecting layer (29 or 39) than at a portion of the contact layer(s) further or more/most distant from the immediately adjacent IR reflecting layer. It is believed that oxidation grading of one or more of contact layer(s) enables the low-E coating 3 to achieve the combination of heat treatability and high visible transmission (which was not previously achievable using $NiCrO_x$ contact layers in a dual silver low-E coating system.

Third dielectric layer 33 acts as a coupling layer between the two halves of the coating 3, and is of or includes tin oxide in certain embodiments of this invention. However, other dielectric materials may instead be used for layer 33, including but not limited to silicon nitride, titanium dioxide, niobium oxide, silicon oxynitride, zinc oxide, or the like. Fourth dielectric layer 35 functions as a haze reducer in certain embodiments of this invention, and is preferably of or includes silicon nitride (e.g., $Si_3N_4$, or alternatively silicon-rich silicon nitride discussed above). However, in alternative embodiments of this invention, other materials (e.g., SiZrN) may instead be used for dielectric layer 35.

Fifth dielectric layer 43 may be of or include tin oxide in certain embodiments of this invention. However, other dielectric materials may instead be used for layer 43, including but not limited to silicon nitride, titanium dioxide, niobium oxide, silicon oxynitride, zinc oxide, or the like. Protective overcoat dielectric layer 45 is provided at least for durability purposes, and may be of or include silicon nitride (e.g., $Si_3N_4$) in certain embodiments of this invention. However, other dielectric materials may instead be used for layer 45, including but not limited to titanium dioxide, silicon oxynitride, tin oxide, zinc oxide, niobium oxide, SiZrN, or the like.

Other layer(s) below or above the illustrated coating 3 may also be provided. Thus, while the layer system or coating 3 is "on" or "supported by" substrate 2 (directly or indirectly), other layer(s) may be provided therebetween. Thus, for example, coating 3 of FIG. 6 may be considered "on" and "supported by" the substrate 2 even if other layer(s) are provided between layer 23 and substrate 2. Moreover, certain layers of coating 3 may be removed in certain embodiments, while others may be added in other embodiments of this invention without departing from the overall spirit of certain embodiments of this invention.

While various thicknesses may be used for the layers of multi-layer coating 3, exemplary thicknesses and example materials for the respective layers on the glass substrate 2 are as follows:

TABLE 1

(Example Materials/Thicknesses for Coating 3)

| Layer | Preferred Range (Å) | More Preferred (Å) | Example (Å) |
|---|---|---|---|
| $TiO_2$ (layer 23) | 0–400 Å | 50–250 Å | 100 Å |
| $Si_xN_y$ (layer 25) | 0–400 Å | 50–250 Å | 170 Å |
| $NiCrO_x$ (layer 27) | 5–100 Å | 10–50 Å | 18 Å |
| Ag (layer 29) | 50–250 Å | 80–120 Å | 105 Å |
| $NiCrO_x$ (layer 31) | 5–100 Å | 10–50 Å | 16 Å |
| $SnO_2$ (layer 33) | 0–800 Å | 500–850 Å | 650 Å |
| $Si_xN_y$ (layer 35) | 0–800 Å | 50–250 Å | 170 Å |
| $NiCrO_x$ (layer 37) | 5–100 Å | 10–50 Å | 18 Å |
| Ag (layer 39) | 50–250 Å | 80–120 Å | 105 Å |
| $NiCrO_x$ (layer 41) | 5–100 Å | 10–50 Å | 16 Å |
| $SnO_2$ (layer 43) | 0–500 Å | 100–300 Å | 150 Å |
| $Si_3N_4$ (layer 45) | 0–500 Å | 100–300 Å | 250 Å |

In other example embodiments, dielectric layer 23 may be removed, and/or layers 23 and 25 may be replaced with a single silicon nitride layer of either $Si_3N_4$ or of the Si-rich type of silicon nitride described above.

In certain exemplary embodiments of this invention, coating/layer systems 3 according to example embodiments have the following low-E characteristics before/after heat treatment (HT) when in monolithic form, as set forth in Table 2:

TABLE 2

Monolithic Before/After Heat Treatment (HT)

| Characteristic | General | More Preferred | Most Preferred |
|---|---|---|---|
| $R_s$ (ohms/sq.)(before HT): | <=10.0 | <=8.0 | <=5.0 |
| $R_s$ (ohms/sq.)(after HT): | <=8.0 | <=6.0 | <=4.0 |

TABLE 2-continued

Monolithic Before/After Heat Treatment (HT)

| Characteristic | General | More Preferred | Most Preferred |
|---|---|---|---|
| $E_n$ (before HT): | <=0.08 | <=0.06 | n/a |
| $E_n$ (after HT): | <=0.07 | <=0.05 | n/a |
| Haze (after HT): | <=0.40 | <=0.30 | <=0.28 |

An example low-E coating 3 was deposited as follows on substrate 2 using a Leybold Terra-G six-chamber sputter coating apparatus. Five cathodes were in each chamber, so there were a total of 30 cathode targets in the sputter coater. Cathode numbering utilizes the first digit to refer to the coater chamber, and the second digit to refer to the cathode position in that chamber. For example, cathode #32 was the second cathode (second digit) in the third (first digit) sputter chamber. Cathode #s C13, C14, C23, C62, C31, C32, C62, C64 and C65 were Twin Mag II type cathodes; cathode #C42 was a dual C-Mag type cathode; and cathode #s C44, C51, and C53 were planar cathodes. In the sputter coater, layers 27–31 and 37–41 were sputtered onto the substrate using DC power sputtering, while the other layers were sputtered onto the substrate using a mid-frequency AC type system. Below, "*" means Al content of approximately 10%. The line speed was 2.6 meters per minute (m/min.). All gas flows (e.g., oxygen, argon, nitrogen) are presented in units of mL/minute. In the below examples, though not shown in the charts, the oxygen flow was turned off at the sides of the NiCr targets discussed above in order to oxidation grade the contact layers 31 and 41 so that they were more oxidized further from the Ag layer(s). Volts refers to cathode volts, and amps (A) refers to cathode amps. "Tr" stands for trim; and trim (Tr) console, trim (Tr) Mid, and trim (Tr) pump are all measured in mL/minute. Pressure is measured in mbar x $10^{-3}$. Trim gas refers to individually adjusted gas flows along the cathode length to make corrections regarding layer thickness uniformity. The NiCr targets were approximately 80/20 NiCr. The process is broken into three separate charts (i.e., Part #s 1–3) because so much information is presented; only the cathode and target data is provided for all three charts for ease of reference. Both silicon nitride layers 25 and 35 were Si-rich through their entire thickness(es); as can be seen by the fact that much more inert argon (Ar) gas than nitrogen gas was used in sputtering these silicon nitride layers.

TABLE 3

Coater Setup/Processes for Coating 3

(Part #1)

| Cathode | Target | Volts (V) | Power (kW) | Ar Flow (mL/min) | $O_2$ (mL/min) | $N_2$ (mL/min) |
|---|---|---|---|---|---|---|
| #13 | Ti | 743 | 73 | 200 | 25 | 80 |
| #14 | Ti | 703 | 64 | 200 | 35 | 50 |
| #23 | Ti | 738 | 63.5 | 200 | 35 | 50 |
| #42 | Si* | 456 | 29.7 | 225 | 0 | 165 |
| #44 | NiCr | 370 | 4.3 | 150 | 38 | 0 |
| #51 | Ag | 432 | 3.2 | 100 | 0 | 0 |
| #53 | NiCr | 386 | 4.1 | 150 | 48 | 0 |
| #62 | Sn | 431 | 18.3 | 200 | 240 | 100 |
| #31 | Sn | 477 | 24.2 | 200 | 290 | 100 |
| #32 | Sn | 428 | 24.5 | 200 | 300 | 100 |
| #42 | Si* | 453 | 30.2 | 225 | 0 | 165 |
| #44 | NiCr | 360 | 4.2 | 150 | 38 | 0 |
| #51 | Ag | 430 | 3.2 | 100 | 0 | 0 |

TABLE 3-continued

Coater Setup/Processes for Coating 3

| #53 | NiCr | 380 | 4.1 | 150 | 48 | 0 |
| #62 | Sn | 442 | 18.4 | 200 | 240 | 100 |
| #64 | Si* | 554 | 40.6 | 200 | 0 | 200 |
| #65 | Si* | 545 | 40.3 | 250 | 0 | 200 |

(Part #2 continued from Part #1 above[cathode/target in common])

| Cathode | Target | Amps (A) | Tank Voltage (V) | Freq. (kHz) | Trim Gas |
|---|---|---|---|---|---|
| #13 | Ti | 128 | 364 | 26.7 | $O_2$ |
| #14 | Ti | 125 | 346 | 26.7 | $O_2$ |
| #23 | Ti | 110 | 344 | 26.5 | $O_2$ |
| #42 | Si* | n/a | 230 | 26.18 | $N_2$ |
| #44 | NiCr | 11.4 | 0 | 0 | Ar |
| #51 | Ag | 74 | 0 | 0 | Ar |
| #53 | NiCr | 10.7 | 0 | 0 | Ar |
| #62 | Sn | 45 | 203 | 25.03 | $O_2$ |
| #31 | Sn | 61 | 224 | 25.6 | $O_2$ |
| #32 | Sn | 60 | 225 | 25.64 | $O_2$ |
| #42 | Si* | n/a | 230 | 26.18 | $N_2$ |
| #44 | NiCr | 11.6 | 0 | 0 | Ar |
| #51 | Ag | 7.4 | 0 | 0 | Ar |
| #53 | NiCr | 10.5 | 0 | 0 | Ar |
| #62 | Sn | 42 | 208 | 25.1 | $O_2$ |
| #64 | Si* | 93.5 | 264 | 26.4 | $N_2$ |
| #65 | Si* | 93.5 | 273 | 26.2 | $N_2$ |

(Part #3 continued from Parts #1–2 above[cathode/target in common])

| Cathode | Target | Tr Console | Tr Mid | Tr Pump | Pressure | Lambda | Lam. active |
|---|---|---|---|---|---|---|---|
| #13 | Ti | 7.5 | 15 | 7.5 | $2.79E^{-03}$ | 252 | True |
| #14 | Ti | 12.5 | 25 | 12.5 | $3.03E^{-03}$ | 252 | True |
| #23 | Ti | 7.5 | 35 | 7.5 | $4.83E^{-03}$ | 252 | True |
| #42 | Si* | 50 | 5 | 45 | $2.18E^{-03}$ | 0 | False |
| #44 | NiCr | 15 | 70 | 15 | $2.26E^{-03}$ | 0 | False |
| #51 | Ag | 15 | 70 | 15 | $1.37E^{-03}$ | 0 | False |
| #53 | NiCr | 15 | 70 | 15 | $2.16E^{-03}$ | 0 | False |
| #62 | Sn | 15 | 70 | 15 | $2.12E^{-03}$ | 220 | True |
| #31 | Sn | 15 | 70 | 15 | $2.97E^{-03}$ | 220 | True |
| #32 | Sn | 15 | 70 | 15 | $3.19E^{-03}$ | 220 | True |
| #42 | Si* | 50 | 5 | 45 | $2.52E^{-03}$ | 0 | False |
| #44 | NiCr | 15 | 70 | 15 | $2.30E^{-03}$ | 0 | False |
| #51 | Ag | 15 | 70 | 15 | $1.44E^{-03}$ | 0 | False |
| #53 | NiCr | 15 | 70 | 15 | $2.38E^{-03}$ | 0 | False |
| #62 | Sn | 15 | 70 | 15 | $2.24E^{-03}$ | 220 | True |
| #64 | Si* | 20 | 60 | 20 | $2.88E^{-03}$ | 0 | False |
| #65 | Si* | 20 | 60 | 20 | $3.61E^{-03}$ | 0 | False |

After the example of coating 3 was sputtered onto substrate 2 in accordance with the above, it was tested/measured as follows in Table 4 (i.e., in a monolithic state). Heat treatment (HT) was performed by placing the coated articles into a furnace heated to about 625 degrees C. for about five (5) minutes, for purposes of simulating heat bending and/or tempering.

TABLE 4

Coating 3 Properties Before/After Heat Treatment (HT)(Monolithic)

| Characteristic | Example of Coating 3 |
|---|---|
| $T_{vis}$, Ill. A, 2° (before HT): | >=70% |
| $T_{vis}$, Ill. A, 2° (after HT): | >=78% |
| $R_s$ (ohms/sq.)(before HT): | 4.43 |
| $R_s$ (ohms/sq.)(after HT): | 3.46 |
| $E_n$ (before HT): | <=0.06 |
| $E_n$ (after HT): | <=0.05 |
| Haze (after HT): | 0.15 |

After coating 3 has been sputtered onto substrate 2, the coating is deleted at certain areas (e.g., 4a, 4b, 4c, 4d) of the substrate 2. The coating may also be deleted at the edge of the substrate as shown by deletion line 12 in FIG. 6. Referring to FIGS. 1 and 6, after coating 3 has been deleted from certain areas (e.g., 4a, 4b, 4c, 4d) of substrate 2 as shown by deletion lines 12, bus bars 7 and 9 (e.g., of or including Ag inclusive frit or any other suitable material) are silk screen deposited/printed on substrate 2. The conductive bus bars 7 and 9 are deposited on the substrate 2 over coating 3 in areas where the bus bars are to be in contact with the coating so as to contact the outer coating surface. However, in areas where coating 3 has been deleted, the bus bars are deposited directly on the substrate or alternatively on the substrate over an opaque enamel layer or the like (e.g., see bus bar portion 7f in FIG. 1). After deposition of the bus bars 7 and 9, in areas where the bus bars are provided over the coating 3 dielectric layers 43 and 45 of coating 3 are located between the bus bars 7, 9 and the electroconductive layers 29, 39 of coating 3. Thus, the bus bars are not in electrical contact with conductive layers 29, 39 at this time (see FIG. 6). In certain embodiments of this invention, bus bars 7 and 9 are each from about 2 to 30 μm thick, more preferably from about 5–15 μm thick, and sometimes about 10 μm thick. Accordingly, bus bars 7 and 9 are much thicker than layers of coating 3 as deposited, although the drawings do not necessarily illustrate this for purposes of simplicity.

Referring to FIG. 7, the FIG. 6 structure is then heated (e.g., to a temperature of at least 400 degrees C., more preferably from about 500 to 700 degrees C.) for a period of time (e.g., at least one minute, more preferably from about 3–15 minutes) so that the bus bars 7 and 9 become molten or at least reach a flowable semi-molten state (i.e., the transition/transformation and/or flowable temperature of bus bars 7 and 9 may be less than that of layers 29 and 39). In certain example embodiments, this heating may also be used for heat bending the coated article into the desired windshield shape in windshield embodiments (i.e., the bus bars flow into contact with the Ag layers of the coating during the heat bending process). In alternative embodiments, this heating may be different from any heat bending.

During this bus bar bleeding or heating step (which may or may not be performed simultaneously with heat bending), it has surprisingly been found that at least portions of molten or semi-molten bus bars 7 and 9 bleed/flow and/or migrate downward through at least dielectric layers 43 and 45 of coating 3 until coming into contact with conductive layer(s) 39 and/or 29 of coating 3 as shown in FIG. 7. The portions of bus bars 7 and 9 extending below the surface of coating 3 (i.e., below the outer surface of layer 45) may be referred to as the run-off or bleeded portion(s) of the bus bar(s). The bus bars and/or coating may be heated to an extent such that the bus bars end up contacting only one conductive layer 39, or alternatively to an extent such that the bus bars end up contacting both conductive layers 29 and 39 of coating 3 though contact holes 58 formed in coating 3 (the contact holes 58 are formed in at least layers 41, 43 and 45 by the bleeding downward of the bus bar material). The bleeding of the bus bars 7 and 9 may or may not reach substrate 2 in different embodiments of this invention, depending upon how long and to what temperature the FIGS. 6–7 structure is heated. In preferred embodiments, after this heating/bleeding step and subsequent cooling and solidifying of the bus bars 7 and 9, the newly formed bus bars are now in electrical contact with conductive layer(s) 29 and/or 39 as shown in FIG. 7 while still retaining their presence at the upper surface of coating 3 so that they can be in electrical contact with connectors 8. Because conductive bus bar portion 7f is not over coating 3, significant bleeding of the same does not occur during this heating step. Connectors 8 may be attached to the bus bars 7 and/or 9 at this point in the process (i.e., before lamination to another substrate).

Referring to FIGS. 1 and 7–8, after formation of the FIG. 7 structure as described above, the FIG. 7 structure is laminated to another substrate (e.g., glass substrate) 4 via PVB layer 5 thereby resulting in the heatable windshield of FIGS. 1 and 8. Optionally, an opaque enamel layer (e.g., black or dark enamel) 51 may be provided on the interior surface of substrate 4 adjacent only relevant edge(s) thereof as shown in FIG. 8 in order to shield one or more of bus bars 7, 9 from the view of persons viewing the heatable window from outside the vehicle. Also, in certain optional embodiments, an opaque enamel layer (e.g., black or dark enamel) 53 may be provided on the #4 surface of the windshield or window (i.e., on the outer surface of inner substrate 2) adjacent only relevant edge(s) thereof as shown in FIG. 8 in order to shield one or more of bus bars 7, 9 from the view of persons viewing the heatable window from the vehicle interior. Instead of including enamel, layer(s) 51 and/or 53 may instead be of or include an opaque organic material such as a black primer.

Following formation of the FIG. 1, 8 heatable window structure, it may be installed into a vehicle to complete a vehicle window assembly. When electric current is run through conductive layer(s) 29 and/or 39 of coating 3 via bus bars 7, 9, heat is generated by the coating portions 3a, 3b and 3c. This heat may be used to defog the window, defrost the window, and/or melt snow/ice from the window or wipers therefor.

It is noted that the multi-layer coating 3 of FIGS. 6–8 is provided for purposes of example only, and this invention is not so limited. For example, this invention is also applicable to coatings having only one electroconductive layer, as well as to coatings including three or more conductive layers. Different dielectric layers may also be used.

In certain example embodiments, vehicle windows according to certain embodiments of this invention may be characterized as follows in Table 5, though the invention is not so limited unless the same is recited in the claims.

TABLE 5

Color/Transmission After HT; Laminated Form

| Characteristic | General | More Preferred |
|---|---|---|
| $T_{vis}$ (Ill. A, 2 deg.): | >=70% | >=75% |
| $T_{vis}$ (Ill. C, 2 deg.): | >=70% | >=75% |
| $R_gY$ (Ill. A, C; 2 deg.): | <=11% | <=9% |
| $a*_g$ (Ill. A, C; 2°): | −2.0 to +2.0 | −1.0 to +1.0 |
| $b*_g$ (Ill. A, C; 2°): | −10.0 to +1.0 | −8.0 to −2.0 |
| $R_fY$ (Ill. A, C; 2 deg.): | <=11% | <=9% |
| $a*_f$ (Ill. A, C; 2°): | −3.0 to +1.0 | −2.0 to 0.0 |
| $b*_f$ (Ill. A, C; 2°): | −5.0 to 0.0 | −4.0 to −1.0 |
| $R_{solar}$: | >=26% | >=28% |
| Haze: | <=0.4 | <=0.3 |
| $T_{solar}$: | >=50% | >=48% |

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A heatable vehicle window comprising:

first and second substrates laminated to one another via at least one polymer inclusive interlayer;

a coating including at least one heatable conductive layer supported by said first substrate, said coating divided into at least first, second and third spaced apart heatable coating portions via respective coating deletion areas, said second heatable coating portion being located at least partially between said first and third heatable coating portions;

first and second conductive bus bars, each of said first and second bus bars being in electrical communication with each of said first, second and third spaced apart heatable coating portions;

wherein said first bus bar includes a protruding portion located over part of said second heatable coating portion, but not over said first and third heatable coating portions, said protruding portion of said first bus bar protruding toward said second bus bar; and wherein each of said first, second and third coating portions is heated when current runs through said first and second bus bars.

2. The window of claim 1, wherein said protruding portion of said first bus bar comprises first and second conductive and approximately parallel leg portions, and a conductive base portion which connects said first and second leg portions.

3. The window of claim 2, further comprising a toll window and/or rain sensor coating deletion area located at least partially between said leg portions of said protruding portion of said first bus bar.

4. The window of claim 3, wherein said first bus bar further comprises another bus bar portion which is approximately parallel to said conductive base portion and connects said leg portions, and wherein a toll window and/or rain sensor coating deletion area is located in an area defined by said leg portions, said base portion and said another bus bar portion of said first bus bar.

5. The window of claim 2, said first and second leg portions are located closely adjacent to first and second linear-shaped coating deletion areas, respectively, said first linear-shaped coating deletion area located between said first and second coating portions and said second linear-shaped coating deletion area located between said second and third coating portions.

6. The window of claim 1, wherein a distance d1 between said first and second bus bars across a portion of said first coating portion is at least 5 cm greater than a distance d2 between said first and second bus bars across a portion of said second coating portion.

7. The window of claim 6, wherein a distance d1 between said first and second bus bars across a portion of said first coating portion is at least 15 cm greater than a distance d2 between said first and second bus bars across a portion of said second coating portion.

8. The window of claim 6, wherein a voltage difference ($\Delta V$) between the first and second coating portions is no greater than about 20 V.

9. The window of claim 8, wherein a voltage difference ($\Delta V$) between the first and second coating portions is no greater than about 10 V.

10. A heatable vehicle window comprising:
    a heatable layer supported by a substrate, said heatable layer divided into at least first, second, and third heatable layer portions, the second heatable layer portion being located at least partially between said first and third heatable layer portions;
    a top bus bar in electrical communication with each of said first, second, and third matable layer portions;
    a bottom bus bar in electrical communication with each of said first, second, and third heatable layer portions; and
    wherein said top and bottom bus bars are positioned closer to one another across a portion of said second heatable layer portion than they are across respective portions of said first and third heatable layer portions.

11. The window of claim 10, wherein said top bus bar includes a protruding portion comprising first and second conductive and approximately parallel leg portions, and a conductive base portion which connects said first and second leg portions.

12. The window of claim 11, further comprising a toll window and/or rain sensor layer deletion area where said layer is deleted, said deletion area being located at least partially between said leg portions of said protruding portion of said top bus bar.

13. The window of claim 10, wherein a distance d1 between said top and bottom bus bars across a portion of said first heatable layer portion is at least 10 cm greater than a distance d2 between said top and bottom bus bars across a portion of said second heatable layer portion.

14. The window of claim 13, wherein distance d1 is at least 15 cm greater than distance d2.

15. The window of claim 10, wherein a voltage difference ($\Delta V$) between the first and second heatable layer portions is no greater than about 20 V.

16. The window of claim 15, wherein a voltage difference ($\Delta V$) between the first and second heatable layer portions is no greater than about 10 V.

17. A heatable window comprising:
    first and second substrates laminated to one another via at least one polymer inclusive interlayer;
    a heatable coating supported by at least one of said substrates, and located between said substrates;
    said heatable coating divided into at least first and second coating portions that are spaced apart from one another via at least one insulating area, a portion of said second coating portion being deleted so as to enable signal for a rain sensor and/or a toll device to easily pass through the window at a resulting coating deletion area;
    first and second conductive bus bars each in electrical communication with said first and second coating portions; and
    wherein said first bus bar is closer to said second bus bar across a portion of said second coating portion than across a portion of said first coating portion, and at least portions of said first and second coating portions are heated when current is passed therethrough via said first and second bus bars.

18. The window of claim 17, wherein said coating deletion area being completely surrounded on all lateral sides by said coating and not located between said first and second bus bars.

19. The window of claim 17, wherein a distance d1 between said first and second bus bars across a portion of said first coating portion is at least 5 cm greater than a distance d2 between said bus bars across a portion of said second coating portion.

* * * * *